C. O. LORENZ.
INDUCTANCE DEVICE FOR WIRELESS ELECTRICAL SIGNALING.
APPLICATION FILED NOV. 7, 1910.
1,133,441.
Patented Mar. 30, 1915.
2 SHEETS—SHEET 1.
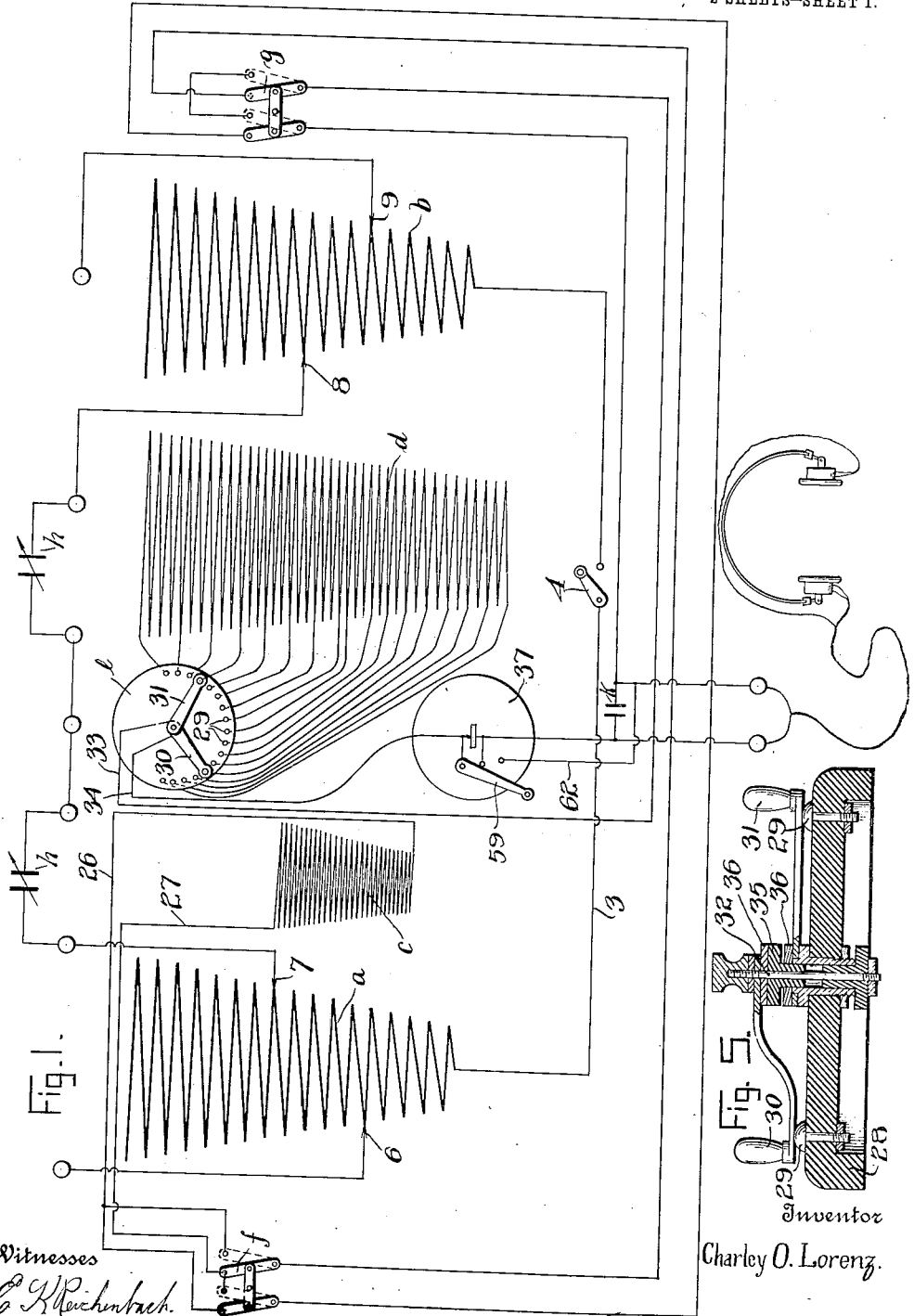
Inventor
Charley O. Lorenz.
By Knight Bros
his Attorney
Witnesses
C. K. Reichenbach.
J. M. Wynkoop.

C. O. LORENZ.
INDUCTANCE DEVICE FOR WIRELESS ELECTRICAL SIGNALING.
APPLICATION FILED NOV. 7, 1910.
1,133,441.
Patented Mar. 30, 1915.
2 SHEETS—SHEET 2.
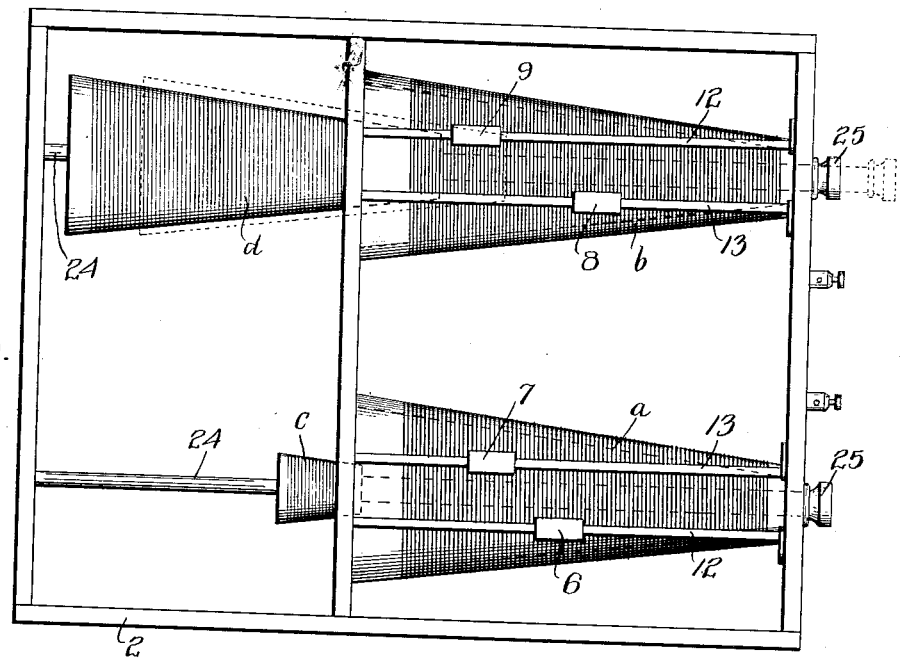
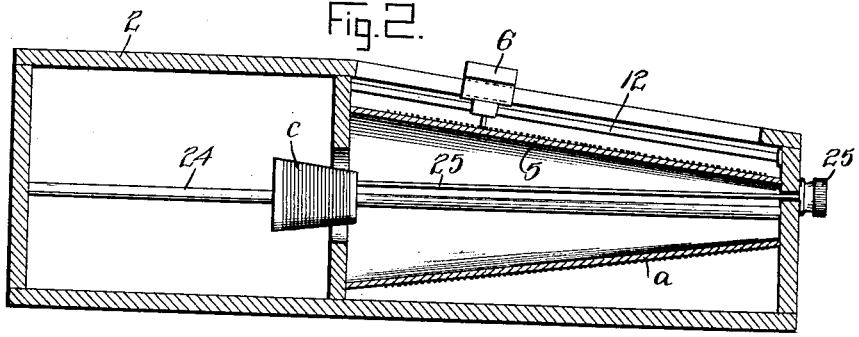
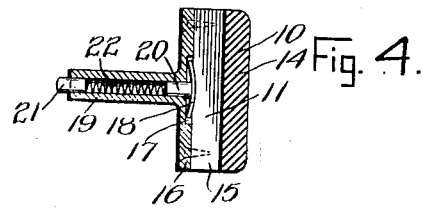
Witnesses
C. K. Reichenbach.
J. M. Wynkoop
Inventor
Charley O. Lorenz.
By Knight Bros
his Attorneys

UNITED STATES PATENT OFFICE.

CHARLEY O. LORENZ, OF PORT ARTHUR, TEXAS.

INDUCTANCE DEVICE FOR WIRELESS ELECTRICAL SIGNALING.

1,133,441. Specification of Letters Patent. Patented Mar. 30, 1915.

Application filed November 7, 1910. Serial No. 591,130.

*To all whom it may concern:*

Be it known that I, CHARLEY O. LORENZ, a citizen of the United States, and resident of Port Arthur, in the county of Jefferson and State of Texas, have invented certain new and useful Improvements in Inductance Devices for Wireless Electrical Signaling, of which the following is a specification.

This invention relates to the art of receiving intelligible signals transmitted by means of electro-magnetic waves, without the use of wires or other material means to guide the waves to their destination.

The main or general object of the present invention is to provide means which may receive messages transmitted in the form of dots, dashes or spoken words through space from one given station to any desired place with greater accuracy and precision than has heretofore been possible.

The above object is attained by the employment of novel means which permits the instrument to be adjusted or regulated in such a manner that the varying atmospheric conditions will have no detrimental effect on the instrument and which materially increases the selectivity of the instrument.

One of the great objections to the art of wireless telegraphy heretofore has been the inability of the various receiving stations to so regulate their instruments that static interference as well as the effect of adjacent high powered lines, arc lights, etc., will be eliminated.

In the present invention I have provided an improved tuning transformer, whereby interference from collateral sources will be reduced to a minimum.

Broadly speaking my improved tuning transformer comprises co-axially related primary and secondary coils tapered in the direction of their common axis with the combined advantages of permitting modification to the air gap between the coils with a minimum reduction of their inductive relationship and at the same time permitting the cutting in or out, of different sizes of convolutions or individual coils and effecting very much closer tuning.

To more clearly illustrate, and without intending to limit my invention, a pair of primary and secondary coils may be employed, each of said coils being cone-shaped or tapered, the secondary coils telescoping the primary coils. Thus the primary coils may be $1\frac{1}{4}$ inches in diameter at one end and 4 inches in diameter at the opposite end and of any suitable length. It will of course be understood that the diameters of the coils may vary, depending upon the character of instrument, either portable or stationary, and that the above dimensions are simply given so that a given comparison of the effectiveness of my tuning transformer may be made with the ordinary tuners employing cylindrical coils of a single unvarying diameter. In combination with these cone-shaped coils I employ novel sliding contacts, more specifically described hereinafter, and which may be moved over said coils to vary the induction. When the contact is moved over one turn of the winding on the lower end of the primary coil, the induction will be increased only a fraction, but if the contact is made at the large end of the coil the induction is increased about four times as much as at the small end, thus increasing the tuning of the instrument to a marked degree.

A still further object of the invention comprises means in combination with the primary and secondary coil whereby one of the secondary coils may be cut out and thus rendered inoperative, under which condition the respective primary coil will act as a balance for the aerial circuit.

Further objects and advantages of the present invention will appear from the following description with reference to the accompanying drawings, wherein:—

Figure 1 is a diagrammatic view of my invention. Fig. 2 is a sectional view through the casing showing the relative position of one of the primary and secondary coils. Fig. 3 is a top plan view of the two primary and secondary coils, together with the adjusting means of the secondary coils, also disclosing the position of the sliding contacts relative to the coils. Fig. 4 is a detail sectional view of one of the sliding contacts. Fig. 5 illustrates in detail, a sectional view of one embodiment of my improved controller switch.

Referring to the drawings wherein like reference characters indicate like parts throughout the different views, the characters *a* and *b* indicate two cone-shaped primary coils mounted within a suitable casing 2, see Figs. 2 and 3, and electrically connected by means of the wire 3. This wire 3 is provided with a small cut out switch 4, whereby the connection between the two coils may be cut out. These coils comprise a core of non-inductive material such as mica, fiber or suitable composition 5, while the winding may be of any suitable wire. Each of the primary coils have two sliding contacts 6, 7, 8 and 9 respectively, which are movable over the windings of the coil and adapted to vary the number of active turns thereof. The sliding contacts each comprise a holder 10, longitudinally apertured as at 11 to permit the mounting of a holder on each of the rods 12 and 13.

The top section 14 of the holder is constructed of any non-conducting material such as hard rubber, and is provided with depending side flanges 15, secured by suitable means, (such as is shown in dotted lines in Fig. 4) to a metallic base plate 16.

On the upper face of the base plate 16 a small countersink 17 is formed wherein a leaf spring contact plate 18 is positioned. This contact plate is flexed outwardly from the countersink, and thus projects into the aperture 11, so that it will insure a perfect contact at all times with the rod over which the sliding contact travels. A tubular finger, or projection 19 extends downwardly from the base plate, the bore thereof communicating with the countersink and adapted to receive therein the annular lug 20 carried by the spring contact 18.

Fitted within the lower end of the tubular member 19, and extending therefrom, is a contact point 21 which is electrically connected to the contact plate 18 and at the same time maintained in its contactual position by means of the coil spring 22. This contact point 21 moves over the windings of the primary coils, the insulation on the said coils being removed throughout the path of the contacts, so that the point 21 contacts directly with the bare wire of the coils.

Referring to Figs. 2 and 3, it will be seen that a pair of parallel rods 12 and 13 are mounted adjacent to and substantially parallel with each of the primary coils. The rods 12 are electrically connected to the aerial circuit while the rods 13 are each electrically connected to the ground. In order that perfect conduction may be assured between the coils and rods 12 and 13, one end of a flexible wire is connected to the metallic base plate 16 of the holder, and the other is secured directly to the said rods. The two secondary coils $c$ and $d$ are adapted to telescope the primary coils $a$ and $b$ respectively and, as shown in Figs. 2 and 3, are mounted upon rods 24. Inasmuch as the active turns of coils or windings $a$ and $b$ are regulated by the adjustment of the sliding contacts, it is desirable to so adjust the secondary coils, that the active turns thereof will be directly under the active turns of the primary coils. This is accomplished by providing adjusting bars 25, one of which is secured to each secondary coil. These bars are slidably journaled in the casing 2 and are provided with a scale (not shown) whereby the adjustment of the coils may be accurately determined. The secondary coil $c$ is much smaller than coil $d$, and is wound with a single layer of wire, being provided with two leading out wires 26 and 27. The secondary coil $d$ is wound, in the present instance, in sixteen sections, each section having a leading out wire secured thereto which is connected with a variable switch $e$. In securing the leading out wires to the winding of the coil $d$ an incision is made in the core, and a portion of the winding projected therethrough and securely soldered to the leading out wire.

The construction of the variable switch $e$ is illustrated in detail in Fig. 5, and comprises a base 28 having a series of electrical contact points 29 positioned thereon, each of the points being connected to one of the wires leading from the sectional secondary coil $d$. A pair of levers 30 and 31 pivoted on a common shaft 32 are insulated from each other by the bushings 35 and gaskets 36 and are electrically connected to the wires 33 and 34 respectively, said levers being adapted to be oscillated over the contact buttons whereby any of the sections on the coil $d$ may be cut out or in as desired. By means of this arrangement the detector and aerial circuit may be brought into perfect balance. By combining the switch mechanism with a conical shaped secondary coil, it will be appreciated that an exceedingly fine tuning will result, inasmuch as the sections of the secondary coil $d$ cut in or out may be so selected as to secure a balance of the most minute degree, between the aerial and detector circuits.

The reference characters $f$ and $g$ indicate a pair of pole changing switches. In the position shown in the diagrammatic view, Fig. 1, the detector, telephone receivers and both secondary coils are connected in electrical series. If it is desired to reverse the polarity on the secondary coil $c$ the pole changing switch $f$ is thrown, as is shown in dotted lines in Fig. 1.

When the instrument is to be used for short distance work, or when selective tuning is desired, it is advisable to cut out the secondary coil $c$ completely, and this is accomplished by throwing the switch $g$ to the right as shown in dotted lines in Fig. 1, in which case the primary coil $a$ will act as a balance for the aerial wires.

In order to increase the efficiency of the instrument, and to permit extremely close tuning, two variable condensers $h$ are employed, but for ordinary work it has been found that they are not absolutely necessary.

When the instrument is to be used for receiving messages it is necessary to protect the detector, fixed condenser $k$, and telephone receivers, from burning out by the high frequency currents incident to the sending or transmitting of messages.

It should be understood that while I have specifically described one embodiment of my invention, it will be obvious that many changes may be made therein without departing from the spirit and substance of my invention. Among other changes or immaterial variations, a third variable condenser may be shunted across the minerals of the detector leading to the two binding posts at the back of the case.

Although forming no part of the present invention a detector has been shown diagrammatically in Fig. 1. It is provided with a suitable lever 59, adapted to engage a pair of electric contact buttons, one of which is connected with the switch lever 30 through wire 34, and the other contact button is connected with the telephone receivers through wire 62.

What is claimed is:—

1. In a system of high frequency electrical signaling, an induction device having a primary coil tapering in diameter gradually from one end to the other, and a contact device for each end of said coil adapted to connect the windings of said coil in circuit; said contact devices being independently movable for selectively cutting in and out convolutions of varying length.

2. In a system of high frequency electrical signaling, an induction device comprising primary and secondary coils, each having convolutions at one end smaller than those at the other end, means for axially adjusting one of said coils relatively to the other, and independently movable contact devices having electrical connections which adapt them to cut in and out of circuit, respectively, large and small convolutions of the primary coil.

3. In a wireless telegraph system, a set of conical primary coils, a set of conical secondary coils telescopically arranged relative to the primary coils, and means for adjusting the relative positions of said coils.

4. A receiver for electro-magnetic waves comprising cone-shaped primary and secondary coils, means for adjusting the secondary coils relative to the primary coils and means for varying the inductive turns of one of the secondary coils.

5. A receiver for electro-magnetic waves, comprising a conical primary coil, a conical secondary coil wound in sections, and telescoping said primary coil, and a variable switch coöperating with the secondary coil, whereby the number of active sections may be varied.

6. A receiver for electro-magnetic waves comprising a pair of primary coils, each of said coils varying in diameter, a pair of secondary coils telescopically arranged relative to the primary coils, one of said coils being wound in sections, a variable switch electrically connected to each of said sections, and means for varying the number of active sections in the secondary coil comprising a pair of levers, contact points for said levers connected to the sections of the secondary coil, whereby any of said sections may be cut in or out.

7. In a system for wireless telegraphy, the combination with primary coils, electrically connected rods positioned parallel to said coils, movable contact devices mounted thereon, each comprising a holder having an aperture to receive the rods, a depending projection carried by said holder and provided with a bore communicating with the above named aperture, contacts positioned within each end of said bore and means adapted to electrically connect said contacts and hold them in contact with the coil and the electrically connected rod respectively.

8. A contact device comprising a holder, having an aperture, a projection carried by the holder provided with a bore communicating with the aperture, contacts positioned in each end of said bore and means interposed between said contacts, adapted to electrically connect said contacts and maintain them in contactual position.

9. A contact device comprising a holder, having an aperture, a projection carried by the holder provided with a bore communicating with the aperture, contacts positioned in each end of said bore and spring means interposed between said contacts, adapted to electrically connect said contacts and maintain them in contactual position.

The foregoing specification signed at Houston, Texas, this 2nd day of November, 1910.

CHARLEY O. LORENZ.

In presence of—
  I. J. Ross,
  J. S. Ballard.